United States Patent
Park et al.

(10) Patent No.: US 10,947,420 B2
(45) Date of Patent: *Mar. 16, 2021

(54) PRESSURE-SENSITIVE ADHESIVE COMPOSITION FOR FOLDABLE DISPLAY

(71) Applicant: LG CHEM, LTD., Seoul (KR)

(72) Inventors: Hyon Gyu Park, Daejeon (KR); Dong Kyu Roh, Daejeon (KR); Yoon Kyung Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 98 days.

This patent is subject to a terminal disclaimer.

(21) Appl. No.: 16/295,643

(22) Filed: Mar. 7, 2019

(65) Prior Publication Data

US 2019/0203077 A1 Jul. 4, 2019

Related U.S. Application Data

(63) Continuation of application No. PCT/KR2017/009868, filed on Sep. 8, 2017.

(30) Foreign Application Priority Data

Sep. 9, 2016 (KR) .......................... 10-2016-0116323
Sep. 7, 2017 (KR) .......................... 10-2017-0114557

(51) Int. Cl.
| | | |
|---|---|---|
| *C09J 7/38* | (2018.01) | |
| *C09J 183/04* | (2006.01) | |
| *C09J 7/00* | (2018.01) | |
| *C09J 11/08* | (2006.01) | |
| *C08G 77/18* | (2006.01) | |
| *C08G 77/16* | (2006.01) | |

(52) U.S. Cl.
CPC . *C09J 7/38* (2018.01); *C09J 7/00* (2013.01); *C09J 11/08* (2013.01); *C09J 183/04* (2013.01); *C08G 77/16* (2013.01); *C08G 77/18* (2013.01); *C09J 2203/326* (2013.01); *C09J 2301/408* (2020.08); *C09J 2483/00* (2013.01)

(58) Field of Classification Search
CPC ....... C09J 7/38; C09J 7/00; C09J 7/255; C09J 7/401; C09J 183/04; C09J 2203/00; C09J 77/18; C09J 77/16; C09J 77/20
See application file for complete search history.

(56) References Cited

U.S. PATENT DOCUMENTS

2008/0319099 A1 12/2008 Zhou et al.

FOREIGN PATENT DOCUMENTS

| | | | | |
|---|---|---|---|---|
| KR | 10-2004-0030907 A | 4/2004 | | |
| KR | 10-0466907 B | 1/2005 | | |
| KR | 10-1110534 B | 1/2012 | | |
| KR | 10-2012-0059512 A | 6/2012 | | |
| KR | 10-1447311 B | 9/2014 | | |
| KR | 10-2014-0142004 A | 12/2014 | | |
| KR | 10-2015-0011230 A | 1/2015 | | |
| KR | 10-2015-0033460 A | 4/2015 | | |
| KR | 10-2016-0083583 A | 7/2016 | | |
| KR | 1020160083583 A | * 7/2016 | ................ | C09J 7/02 |
| KR | 2016-0096402 A | 1/2019 | | |
| WO | 2009144192 A1 | 12/2009 | | |

OTHER PUBLICATIONS

Communication and Supplementary European Search Report dated Jul. 19, 2019, for EP application No. 17849124.7, 7 pages.
International Search Report and Written Opinion issued for PCT Application No. PCT/KR2017/009868 dated Dec. 18, 2017, 13 pages.

* cited by examiner

*Primary Examiner* — Robert S Jones, Jr.
(74) *Attorney, Agent, or Firm* — Rothwell, Figg, Ernst & Manbeck. P.C.

(57) ABSTRACT

The present application relates to a pressure-sensitive adhesive composition for a foldable display and a use thereof. The pressure-sensitive adhesive composition of the present application has excellent bending reliability while having appropriate adhesive force and cohesive force, thereby being useful for forming a pressure-sensitive adhesive layer for a foldable display.

16 Claims, No Drawings

PRESSURE-SENSITIVE ADHESIVE COMPOSITION FOR FOLDABLE DISPLAY

CROSS-REFERENCE TO RELATED APPLICATIONS

This application is a Continuation of International Application No. PCT/KR2017/009868, filed on Sep. 8, 2017, and designating the United States, which claims the benefit of priority under Korean Patent Application No. 10-2016-0116323 on Sep. 9, 2016 and Korean Patent Application No. 10-2017-0114557 on Sep. 7, 2017, the disclosures of are incorporated herein by reference in their entirety.

TECHNICAL FIELD

The present application relates to a pressure-sensitive adhesive composition for a foldable display and a use thereof.

BACKGROUND ART

Recently, with the development of display related technologies, display devices that can be deformed at the use stage, such as folding, winding in a roll form, or stretching like a rubber band are being studied and developed. Since these displays can be modified into various forms, it is possible to satisfy both demands for enlargement of the display at the use stage and miniaturization of the display for carrying.

The deformable display device can be modified in various forms in accordance with the requirements of the user or depending on the needs of situations where the display device is used, as well as capable of being transformed into a predetermined form. Therefore, it is necessary to recognize the deformed shape of the display and to control the display device in accordance with the recognized shape.

On the other hand, since the deformable display device has a problem that each of constitutions of the display device is damaged according to the modification, each of the constitutions of the display device must satisfy folding reliability and stability.

PRIOR ART DOCUMENTS

Patent Documents

Patent Document 1: Korean Laid-Open Patent Publication No. 2015-0011230 A

DISCLOSURE

Technical Problem

The present application provides a pressure-sensitive adhesive composition for a foldable display and a use thereof.

The present application provides a pressure-sensitive adhesive composition for a foldable display having excellent bending reliability by satisfying a storage elastic modulus in a predetermined range over a wide temperature interval, for example, a temperature interval of −40° C. to 90° C.

The present application also provides a foldable display comprising a pressure-sensitive adhesive layer having excellent adhesive strength and cohesive force, while having bending reliability suitable for a foldable display, and a method for manufacturing the same.

Technical Solution

The present application relates to a pressure-sensitive adhesive composition for a foldable display and a use thereof.

The pressure-sensitive adhesive composition according to the present invention has a storage elastic modulus of not more than $1.0 \times 10^7$ Pa after curing over a wide temperature interval, for example, a temperature interval of −40° C. to 90° C. and thus has physical properties suitable for use in a foldable display.

Such a pressure-sensitive adhesive composition is cured, for example, to form a pressure-sensitive adhesive layer, where the pressure-sensitive adhesive layer is contained in a foldable display, for example, formed on a base film and may exist on one side or both sides of a polarizing plate.

In the present application, the term "foldable display" may mean a flexible display having a radius of curvature in a folded portion of less than 5 mm by being designed such that it can be repeatedly folded and spread like a paper.

The pressure-sensitive adhesive applied to the foldable display must satisfy bending reliability, unlike conventional pressure-sensitive adhesives, and in order for such bending reliability to be excellent, rheologic physical properties, for example, a storage elastic modulus should be maintained within an appropriate range over the temperature range in which an actual foldable display can be used.

Accordingly, the applicant has found that as a pressure-sensitive adhesive composition is prepared by mixing a first pressure-sensitive adhesive exhibiting low tackiness and a second pressure-sensitive adhesive exhibiting high tackiness in a predetermined content, the composition can prevent decrease of folding reliability depending on a rapid rise in rheologic physical properties while having appropriate adhesive strength and minimize a variation width of the storage elastic modulus within the commercial temperature range, and reached the present invention.

That is, the present application relates to a pressure-sensitive adhesive composition for a foldable display comprising a first pressure-sensitive adhesive and a second pressure-sensitive adhesive. In addition, the first pressure-sensitive adhesive is included within the range of 5 wt % to 50 wt % relative to the total solid content of the composition and the pressure-sensitive adhesive composition has a storage elastic modulus after curing of $1.0 \times 10^7$ Pa or less within a temperature range of −40° C. to 90° C.

By mixing an appropriate amount of the first pressure-sensitive adhesive with the second pressure-sensitive adhesive as described above, the pressure-sensitive adhesive composition of the present application can adjust, after curing of the pressure-sensitive adhesive composition, rheologic physical properties, specifically a storage elastic modulus to $1.0 \times 10^7$ Pa or less in the commercial temperature range, specifically −40° C. to 90° C. after curing of the pressure-sensitive adhesive composition.

The present application can also provide a pressure-sensitive adhesive composition for a foldable display which have appropriate adhesiveness and cohesive force and can further secure the aforementioned range of storage elastic modulus by adjusting a structure and molecular weight of a silicone gum contained in the first and second pressure-sensitive adhesives, and the content of an MQ resin in the first and second pressure-sensitive adhesives.

Moreover, the present application can attain excellent adhesiveness, together with the bending reliability required in a foldable display, through addition of additives to be described below or a surface treatment process, and the like. In this application, the adhesiveness or adhesive strength can be represented by a peel force (gf/in) as measured according to the method described herein.

The pressure-sensitive adhesive composition of the present application comprises a first pressure-sensitive adhesive. The first pressure-sensitive adhesive comprises a first silicone gum and has a peel force on a glass substrate of 10 gf/in or less, as measured at a peel rate of 0.3 m/min and a peel angle of 180 degrees. Also, the first pressure-sensitive adhesive is contained in the composition in a range of 5 wt % to 50 wt % relative to the total solid content of the composition.

The first pressure-sensitive adhesive comprises, as a low pressure-sensitive adhesive component having a relatively low adhesive strength as compared with the second pressure-sensitive adhesive, a first silicone gum.

The term "silicone gum" herein is commonly called a polyorganosiloxane compound ordinarily contained in a silicone-based pressure-sensitive adhesive, which can play a role of imparting a constant storage elastic modulus and cohesive force to the pressure-sensitive adhesive composition.

In one example, the first silicone gum may be represented by Formula 1 below.

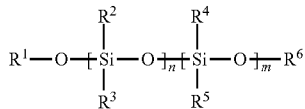

[Formula 1]

In Formula 1 above, $R^1$ and $R^6$ are each independently a silyl group or silanol group with or without an alkyl group, an alkenyl group or an aryl group, $R^2$ to $R^5$ are each independently an alkyl group, an alkenyl group or an aryl group, and n and m are each independently an integer in a range of 1 to 10,000.

In the present application, the term "alkyl group" may mean an alkyl group having 1 to 20 carbon atoms, 1 to 16 carbon atoms, 1 to 12 carbon atoms, 1 to 8 carbon atoms, 1 to 6 carbon atoms or 1 to 4 carbon atoms, unless otherwise specified. The alkyl group may be linear, branched or cyclic. The alkyl group can be exemplified by a linear or branched alkyl group such as a methyl group, an ethyl group, an n-propyl group, an isopropyl group, an n-butyl group, an isobutyl group, a sec-butyl group, a t-butyl group, an n-pentyl group, an isopentyl group, a neopentyl group, an n-hexyl group, an n-heptyl group or an n-octyl group, or a cycloalkyl group such as a cyclobutyl group, a cyclopentyl group, a cyclohexyl group or a cycloheptyl group, and the like. In addition, the alkyl group may be optionally substituted with one or more substituents.

In the present application, the term "alkenyl group" may mean an alkenyl group having 2 to 20 carbon atoms, 2 to 16 carbon atoms, 2 to 12 carbon atoms, 2 to 8 carbon atoms, 2 to 6 carbon atoms, or 2 to 4 carbon atoms, unless otherwise specified. The alkenyl group may be linear, branched or cyclic. The alkenyl group can be exemplified by a vinyl group, a 1-propenyl group, a 2-propenyl group, a 1-butenyl group, a 2-butenyl group or a 3-butenyl group, and the like. Also, the alkenyl group may be optionally substituted with one or more substituents.

In the present application, the term "aryl group" may mean a monovalent residue derived from a compound comprising a benzene ring or a structure in which two or more benzene rings are condensed or bonded, or a derivative thereof, unless otherwise specified. In the range of the aryl group, not only a functional group commonly called an aryl group, but also a so-called aralkyl group or arylalkyl group, and the like can be included. The aryl group may be, for example, an aryl group having 6 to 25 carbon atoms, 6 to 21 carbon atoms, 6 to 18 carbon atoms, or 6 to 12 carbon atoms. The aryl group can be exemplified by a phenyl group, a phenoxy group, a phenoxyphenyl group, a phenoxybenzyl group, a dichlorophenyl group, a chlorophenyl group, a phenylethyl group, a phenylpropyl group, a benzyl group, a tolyl group, a xylyl group or a naphthyl group, and the like. In addition, the aryl group may be optionally substituted with one or more substituents.

In the present application, the term "silanol group" means a functional group comprising Si—OH units.

In the present application, the term "silyl group" means a generic term of a functional group comprising silicon atoms.

In the present application, a specific functional group, for example, the substituent which may be substituted in the alkyl group, alkenyl group or aryl group can be exemplified by an alkyl group, an alkoxy group, an alkenyl group, an epoxy group, a cyano group, a thiol group, a carboxyl group, an acryloyl group, a methacryloyl group, an acryloyloxy group, a methacryloyloxy group or aryl group, and the like, but is not limited thereto.

The first silicone gum may have, for example, a number average molecular weight in a range of 400,000 to 800,000. Within the range of the number average molecular weight, it is possible to provide a pressure-sensitive adhesive composition preventing a rapid change in storage elastic modulus and having an appropriate cohesive force.

Here, the number average molecular weight may be a value measured by a known measuring method using gel permeation chromatography (GPC).

In another example, the silicone gum may have a number average molecular weight in the range of 500,000 to 800,000 or 700,000 to 800,000.

The first silicone gum may also have a suitable cross-linkable functional group to have a good cross-linking degree.

In one example, the first silicone gum may have a content of a cross-linkable functional group, for example, a vinyl group in a range of 0.5 mol % to 1.5 mol % or 0.5 mol % to 1 mol %. Within the content range of the cross-linkable functional group as above, it is possible to have a good cross-linking degree and to secure appropriate adhesive strength and cohesive force.

The first pressure-sensitive adhesive may also comprise an MQ resin.

Here, the term "MQ resin" also means a silicone compound having a three-dimensional reticular steric molecular structure comprising a monofunctional siloxane unit (hereinafter, referred to as "M unit") and a tetrafunctional siloxane unit (hereinafter, referred to as "Q unit"). In addition, the MQ resin may further comprise other bifunctional siloxane units (hereinafter, referred to as "D units") or trifunctional siloxane units (hereinafter, referred to as "T units").

Here, the M unit means a unit represented by a formula $(R_3SiO_{1/2})$ in the industry; the D unit means a unit represented by a formula ($R_2SiO_{2/2}$) in the industry; the T unit means a unit represented by a formula ($R_2SiO_{3/2}$) in the industry; and the "Q unit" means a unit represented by a formula ($SiO_{4/2}$). Here, R means a functional group bonded to a silicon atom (Si).

The MQ resin plays a role of imparting adhesive strength into the pressure-sensitive adhesive, where the first pressure-sensitive adhesive is a low pressure-sensitive adhesive having a relatively low peel force on a glass substrate as compared with the second pressure-sensitive adhesive, so that it may have a very low content of MQ resin over the second pressure-sensitive adhesive.

In one example, the first pressure-sensitive adhesive may comprise the first MQ resin in a content of less than 5 wt %. If the content of the first MQ resin is 5 wt % or more, the adhesive strength may be excessively increased and the storage elastic modulus may be changed radically, which is not preferable.

In another example, the first pressure-sensitive adhesive may comprise the first MQ resin in a content of less than 4 wt %, less than 3 wt %, less than 2 wt %, or less than 1 wt %. The lower limit value of the first MQ resin content may be, for example, 0.0001 wt % or more, 0.001 wt % or more, or 0.01 wt % or more.

In a specific example, the first pressure-sensitive adhesive may comprise 0.0001 to 5 parts by weight of the first MQ resin relative to 100 parts by weight of the first silicone gum. In another example, it may comprise 0.001 to 4.5 parts by weight or 0.01 to 4 parts by weight of the first MQ resin.

The first MQ resin may be represented by, for example, Formula 2 below, but is not limited thereto.

[Formula 2]

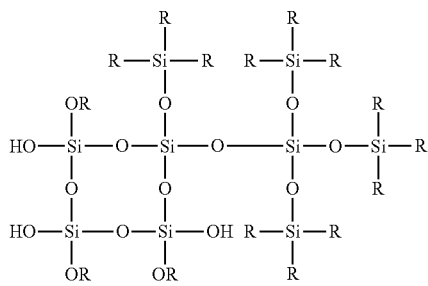

In Formula 2 above, R is hydrogen, a monovalent hydrocarbon group, or an alkenyl group.

The monovalent hydrocarbon group can be exemplified by an alkyl group, an aliphatic cyclic group or an aromatic cyclic group, and the like.

More specifically, the alkyl group can be exemplified by an alkyl group such as methyl, ethyl, propyl or pentyl, and the aliphatic cyclic group can be exemplified by cyclohexyl or the like, and the aromatic cyclic group can be exemplified by phenyl, tolyl, xylyl or benzyl, and the like, without being limited thereto.

Furthermore, the alkenyl group can be exemplified by vinyl, allyl, butenyl, hexenyl or cyclohexenyl, and the like. Meanwhile, the monovalent hydrocarbon group or the alkenyl group may exist in a radical form.

The first MQ resin may further comprise, for example, a D unit or a T unit, where it is preferred that the ratio of the D unit and the T unit further included is less than 5 mol %.

For example, the first MQ resin may have a ratio of the M unit to the Q unit (M:Q) in a range of 0.6:1 to 1.7:1 or 0.7:1 to 1:1. When the M unit is less than 0.6 relative to the Q unit, the initial adhesive strength may be decreased, and when it exceeds 1.7, the cohesive force may be lowered, which is not preferable.

The first MQ resin may comprise a silanol group, where the content of the silanol group may be, for example, in the range of 0.1 mol % to 8 mol % or 0.2 mol % to 5 mol %. When the content of the silanol group is less than 0.1 mol %, the cross-linking density is lowered and the cohesive force is lowered, which is not preferable, and when it exceeds 8 mol %, the adhesive strength is decreased, which is not preferable.

The first MQ resin may comprise, for example, the hydrogen atom in a ratio of 1 to 3 mol % relative to the entire functional group bonded to the silicon atom. By controlling the ratio of the hydrogen atom within the above range, it is possible to prevent an uncured problem, or deterioration of storage stability or the like.

The first MQ resin may have, for example, a number average molecular weight in the range of 3,000 to 7,000. When the MQ resin having a number average molecular weight within the above range is used, excellent cohesive force and adhesive strength can be achieved.

The above-described first pressure-sensitive adhesive is a low pressure-sensitive adhesive having a low adhesive strength, and has a peel force on a glass substrate of 10 gf/in or less, as measured at a peel rate of 0.3 m/min and a peel angle of 180 degrees. In another example, the peel force on a glass substrate may be 9 gf/in or less, 8 gf/in or less, 7 gf/in or less, 6 gf/in or less, 5 gf/in or less, 4 gf/in or less, or 3 gf/in or less. The lower limit value of the peel force of the first pressure-sensitive adhesive on a glass substrate is not particularly limited, but may be 0.1 gf/in or more, for example.

The first pressure-sensitive adhesive may be included in the composition in a range of 5 wt % to 50 wt % relative to the total solid content of the composition. In another example, the first pressure-sensitive adhesive may be included in the composition in a range of 8 wt % to 45 wt % or 10 wt % to 30 wt % relative to the total solid content of the composition.

The pressure-sensitive adhesive composition of the present application further comprises a second pressure-sensitive adhesive. The second pressure-sensitive adhesive has a peel force on a glass substrate of 200 gf/in or more, as measured at a peel rate of 0.3 m/min and a peel angle of 180 degrees.

The second pressure-sensitive adhesive is a high pressure-sensitive adhesive component having a relatively high adhesive strength as compared with the first pressure-sensitive adhesive, and has a high peel force on a glass substrate.

In one example, the second pressure-sensitive adhesive may have a peel force on a glass substrate, as measured at a peel rate of 0.3 m/min and a peel angle of 180 degrees, in the range of 200 gf/in to 10,000 gf/in.

Such a second pressure-sensitive adhesive comprises a silicone gum and an MQ resin.

In one example, the second pressure-sensitive adhesive may be a second-A pressure-sensitive adhesive which comprises a second-A silicone gum and a second-A MQ resin and has a peel force on a glass substrate, as measured at a peel rate of 0.3 m/min and a peel angle of 180 degrees, in the range of 200 gf/in to 400 gf/in.

The second-A pressure-sensitive adhesive is a pressure-sensitive adhesive having a low peel force on a glass substrate as compared with a second-B pressure-sensitive adhesive to be described below, which may have a lower storage elastic modulus value because the content of the MQ resin is lower than that of the second-B pressure-sensitive adhesive.

The second-A pressure-sensitive adhesive may have a storage elastic modulus measured at −40° C. of $10^7$ Pa or less. When the second-A pressure-sensitive adhesive having the storage elastic modulus as described above is mixed with the first pressure-sensitive adhesive, a pressure-sensitive adhesive composition having a storage elastic modulus after curing over a temperature interval of −40° C. to 90° C., of $1.0 \times 10^7$ Pa or less, can be provided.

The second-A pressure-sensitive adhesive comprises a second-A silicone gum and a second-A MQ resin.

The second-A silicone gum may be the same as or different from the above-described first silicone gum.

In one example, the second-A silicone gum may have a structure different from the above-described first silicone gum.

More specifically, the second-A silicone gum may have a low cross-linking degree and a high cross-linking density in order to ensure high adhesive properties despite the second-A pressure-sensitive adhesive of the low MQ resin content.

In one example, the second-A silicone gum may be linear polydimethylsiloxane comprising hydroxy groups at both ends. The linear polydimethylsiloxane having hydroxy groups at both ends means polydimethylsiloxane having a linear structure in which in Formula 1 above, $R^2$ to $R^5$ are all methyl groups and $R^1$ and $R^6$ are $Si(CH_3)_2OH$.

The linear polydimethylsiloxane may be, for example, one that the hydroxy group is in a range of 0.5 mol % to 5 mol % or 1 mol % to 4 mol % relative to the total methyl groups contained in the polydimethylsiloxane. When the hydroxy group is in the above range, it is possible to prevent a curing problem, such as the uncured, by achieving an appropriate cross-linking degree, and to improve long-term properties such as a storage property.

The second-A silicone gum may also have a number average molecular weight in the range of 500,000 to 1,000,000. In another example, the second silicone gum may have a number average molecular weight in the range of 500,000 to 900,000 or 700,000 to 900,000. When the silicone gum having the number average molecular weight within the above range is used, it is possible to provide a pressure-sensitive adhesive composition preventing a rapid change of a storage elastic modulus over an interval from a low temperature of 40° C. to a high temperature of 90° C. and having an appropriate cohesive force.

The second-A silicone gum may have an appropriate viscosity in consideration of adhesive strength, workability and reactivity with the MQ resin, and the like.

The second-A silicone gum may have, for example, a viscosity measured under a condition of 25° C. and 50% relative humidity in a range of 1,000,000 cP to 100,000,000 cP. In another example, the second silicone gum may have a viscosity measured under a condition of 25° C. and 50% relative humidity in the range of 1,500,000 cP to 70,000,000 cP. If the viscosity is less than 1,000,000 cP, the reactivity or the adhesive strength may be lowered, and if the viscosity exceeds 100,000,000 cP, the workability may be significantly lowered.

The second-A MQ resin may be the same as or different from the above-described first MQ resin.

The second-A MQ resin is a component that provides the adhesive strength and cohesive force of the pressure-sensitive adhesive, like the first MQ resin, and a constitution that can change the storage elastic modulus according to the content thereof.

On the other hand, the second pressure-sensitive adhesive has a high pressure-sensitive adhesive property, and may have the MQ resin content higher than that of the first pressure-sensitive adhesive. However, when the content of the second-A MQ resin is too large, the storage elastic modulus of the second-A pressure-sensitive adhesive may exceed $10^7$ Pa at −40° C., so that the second-A pressure-sensitive adhesive may comprise the second-A MQ resin within an appropriate range.

In one example, the second-A pressure-sensitive adhesive may comprise the second-A MQ resin in a content of 40 wt % or less. In another example, the second-A pressure-sensitive adhesive may comprise the second-A MQ resin in a ratio of 38 wt % or less, 36 wt % or less, 34 wt % or less, 32 wt % or less, or 30 wt % or less, and preferably, it may be 36 wt % or less. The lower limit value of the second-A MQ resin content may be, for example, 5 wt % or more, 10 wt % or more, or 15 wt % or more. When the content of the second-A MQ resin in the second-A pressure-sensitive adhesive is controlled within the above range, it is possible to provide a second-A pressure-sensitive adhesive having a storage elastic modulus at −40° C. of $1.0 \times 10^7$ Pa or less.

In a specific example, the second-A pressure-sensitive adhesive may comprise 60 to 95 parts by weight of a second-A silicone gum and 5 to 40 parts by weight of a second-A MQ resin. In another example, the second-A pressure-sensitive adhesive comprises 64 to 90 parts by weight of a second silicone gum and 10 to 36 parts by weight of a second-A MQ resin, or 70 to 85 parts by weight of a second-A silicone gum and 15 to 30 parts by weight of a second-A MQ resin.

The present application can also use a pressure-sensitive adhesive having a higher peel force than the above-mentioned second-A pressure-sensitive adhesive as a second pressure-sensitive adhesive.

In one example, the second pressure-sensitive adhesive may be a second-B pressure-sensitive adhesive which comprises a second-B silicone gum and a second-B MQ resin and has a peel force on a glass substrate, as measured at a peel rate of 0.3 m/min and a peel angle of 180 degrees, in the range of from 1,000 gf/in to 10,000 gf/in.

The second-B pressure-sensitive adhesive has an excellent peel force on a glass substrate as compared to the second-A pressure-sensitive adhesive, and may also have a large content of the MQ resin. On the other hand, since the content of the MQ resin is higher than that of the second-A pressure-sensitive adhesive, the second-B pressure-sensitive adhesive can have a higher storage elastic modulus value than the second-A pressure-sensitive adhesive at a low temperature.

In one example, the second-B pressure-sensitive adhesive may have a storage elastic modulus as measured at −40° C. exceeding $10^7$ Pa.

The second-B pressure-sensitive adhesive comprises a second-B silicone gum and a second-B MQ resin.

The second-B silicone gum may be the same as or different from the first silicone gum or the second-A silicone gum as described above.

In one example, the second-B silicone gum may have a structure different from the first silicone gum and the second-A silicone gum as described above.

More specifically, the second-B silicone gum may be a silicone rubber containing a vinyl group at an end. For example, the silicone rubber may have a structure in which in a state where it has silyl groups comprising a vinyl group at both ends in Formula 1, $R^2$ to $R^5$ are a methyl group or an alkenyl group.

The second-B MQ resin may be the same as or different from the first MQ resin or the second-A MQ resin as described above.

The second-B MQ resin is a component that provides the adhesive strength and cohesive force of the pressure-sensitive adhesive, like the first MQ resin and the second-A MQ resin, and a constitution that can change the storage elastic modulus according to the content thereof.

On the other hand, the second pressure-sensitive adhesive has a high pressure-sensitive adhesive property, and may have the MQ resin content higher than that of the first pressure-sensitive adhesive. Particularly, the second-B pressure-sensitive adhesive has a high storage elastic modulus at a low temperature, and may have the MQ resin content higher than that of the second-A pressure-sensitive adhesive.

In one example, the second-B pressure-sensitive adhesive may comprise the second-B MQ resin in a content of 45 wt % or more. In another example, the second-B pressure-sensitive adhesive may comprise the second-B MQ resin in a ratio of 50 wt % or more, 55 wt % or more, 60 wt % or more, or 65 wt % or more. The upper limit of the second-B MQ resin content may be, for example, 80 wt % or less, 75 wt % or less, or 70 wt % or less.

When the second pressure-sensitive adhesive, in which the content of the second-B MQ resin in the second-B pressure-sensitive adhesive is controlled in the above range, is mixed with the first pressure-sensitive adhesive in a predetermined content, the pressure-sensitive adhesive composition having the desired adhesive characteristics and storage elastic modulus can be provided.

In a specific example, the second-B pressure-sensitive adhesive may comprise 20 to 65 parts by weight of the second-B silicone gum and 45 to 80 parts by weight of the second-B MQ resin.

The pressure-sensitive adhesive composition of the present application comprises the above-described first pressure-sensitive adhesive and second pressure-sensitive adhesive in a predetermined ratio.

In one example, the pressure-sensitive adhesive composition comprises the first pressure-sensitive adhesive in a range of 5 wt % to 50 wt % relative to the total solid content of the composition. In another example, the pressure-sensitive adhesive composition may comprise the first pressure-sensitive adhesive in a range of 8 wt % to 40 wt % or 9 wt % to 35 wt % of the total solid content.

The content of the second pressure-sensitive adhesive can be changed depending on the content of the first pressure-sensitive adhesive in the pressure-sensitive adhesive composition, and for example, the second pressure-sensitive adhesive can be included in the pressure-sensitive adhesive composition in a content within the range of 50 wt % to 95 wt %, 55 wt % to 94 wt %, or 70 wt % to 90 wt %, relative to the total solid content of the composition.

The pressure-sensitive adhesive composition for a foldable display according to the present application may further comprise an organic solvent.

The organic solvent has solubility in the silicone gum and the MQ resin, which can be exemplified by, for example, a saturated hydrocarbon-based organic solvent, a halogenated hydrocarbon solvent, and an aromatic hydrocarbon-based organic solvent.

The saturated hydrocarbon-based organic solvent can be exemplified by, for example, pentane, isopentane, cyclopentane, hexane, cyclohexane, heptane, isoheptane, cycloheptane, octane, isooctane or cyclooctane, and the like; the halogenated hydrocarbon solvent can be exemplified by trichloroethane or chloroform, and the like; and the aromatic hydrocarbon-based organic solvent can be exemplified by, for example, benzene, xylene or toluene, and the like, but are not limited thereto.

The pressure-sensitive adhesive composition for a foldable display according to the present application may further comprise known additives such as an oxidation inhibitor or a curing catalyst, and the kind and content thereof may be easily designed and changed by those skilled in the art, in consideration of the curing type of the first and second pressure-sensitive adhesives or the object of the present application.

On the other hand, the pressure-sensitive adhesive composition for a foldable display according to the present application has an advantage that the desired storage elastic modulus range at a low temperature can be achieved owing to the addition of a low pressure-sensitive adhesive such as the first pressure-sensitive adhesive, but there is a concern that the adhesive strength is decreased. Therefore, by comprising a borane compound, a borate compound and a mixture thereof, the pressure-sensitive adhesive composition may also overcome the above-described problem.

The pressure-sensitive adhesive composition for a foldable display of the present application can have a storage elastic modulus (G') after curing of $1.0 \times 10^7$ Pa or less in a temperature range of $-40°$ C. to $90°$ C. by comprising the above-described first and second pressure-sensitive adhesives.

The storage elastic modulus may be, for example, a value measured according to a manual using a rheometer (Advanced Rheometric Expansion System, Ta Instruments) under a condition of a frequency of 0.1 rad/s to 100 rad/s and a strain rate of 10% or less.

In one example, the storage elastic modulus may be measured using a G2 series rheometer from TA instruments under a condition of a frequency of 6.2 rad/s and a strain rate of 10% or less depending on temperatures, while varying the temperature from $-40°$ C. to $90°$ C., and derived.

Since the storage elastic modulus of the pressure-sensitive adhesive composition after curing is reduced linearly or non-linearly with changing the temperature from $-40°$ C. to $90°$ C., when the pressure-sensitive adhesive composition has a storage elastic modulus not exceeding $1.0 \times 10^7$ Pa at $-40°$ C., it may have a storage elastic modulus value of $1.0 \times 10^7$ Pa or less at a temperature interval of $-40°$ C. to $90°$ C. In another example, the pressure-sensitive adhesive composition of the present application may have a storage elastic modulus (G') after curing of $5.0 \times 10^6$ Pa or less, or $1.0 \times 10^6$ Pa or less within a temperature range of $-40°$ C. to $90°$ C. In addition, the lower limit value of the storage elastic modulus after curing of the pressure-sensitive adhesive composition within the above temperature range may be, for example, $1.0 \times 10^3$ Pa.

In a more specific example, the pressure-sensitive adhesive composition of the present application has a storage elastic modulus value in the range of $1.0 \times 10^3$ Pa to $1.0 \times 10^7$ Pa, $5.0 \times 10^3$ Pa to $1.0 \times 10^7$ Pa or $1.0 \times 10^3$ Pa to $1.0 \times 10^6$ Pa over a temperature interval of $-40°$ C. to $90°$ C. Within the above storage elastic modulus range, it is possible to secure the superiority of the bending reliability suitable for the foldable display.

The present application is also directed to a foldable display. The foldable display of the present application can secure excellent bending reliability required for a foldable display by comprising the pressure-sensitive adhesive layer which is a cured product of the above-described pressure-sensitive adhesive composition.

That is, the present application is directed to a foldable display comprising a pressure-sensitive adhesive layer which is a cured product of a pressure-sensitive adhesive composition for a foldable display attached to an adherend. The pressure-sensitive adhesive composition comprises a first pressure-sensitive adhesive and a second pressure-sensitive adhesive, which may have a storage elastic modulus (G') after curing, as measured within a temperature range of −40° C. to 90° C., of $1.0 \times 10^7$ Pa or less.

The pressure-sensitive adhesive layer in the foldable display of the present application is attached on the adherend.

The adherend may be, for example, a base film.

The base film may also be, for example, a transparent base film having a haze of 10% or less, or 5% or less, or may also be a colored base film having a haze of 30% or more.

As the base film, for example, those formed from polyolefin such as polyethylene or polypropylene; polyester such as polyethylene terephthalate and polyethylene naphthalate; cellulose such as triacetylcellulose, diacetylcellulose, propionylcellulose, butylcellulose or acetylcellulose; polyamide such as 6-nylon or 6,6-nylon; an acrylic polymer such as polymethyl methacrylate; and an organic polymer such as polystyrene, polyvinyl chloride, polyimide, polyvinyl alcohol, polycarbonate or ethylene vinyl alcohol can be used, without being limited thereto.

The base film may also be one formed from one or a mixture of two or more of the foregoing or a polymer, and may also be one having a structure in which a plurality of layers are laminated.

The base film may be, for example, one whose surface has been modified. The surface modification may be performed for the purpose of increasing the adhesive strength with the pressure-sensitive adhesive layer, and specifically, a treatment method such as chemical treatment, corona discharge treatment, mechanical treatment, ultraviolet (UV) treatment, active plasma treatment or glow discharge treatment may be adopted, without being limited thereto.

In one example, when the adherend is a base film, the base film and the pressure-sensitive adhesive layer may have increased adhesive strength by the above surface treatment of the base film and a surface treatment process of a pressure-sensitive adhesive layer to be described below.

That is, in the case of performing the surface treatment process of the base film, functional groups such as —OH is induced on the base film, and the functional group can help to firmly maintain bonding between the base film and the pressure-sensitive adhesive layer as a whole, by forming covalent bonds with the silanol groups.

Specifically, when a treatment such as chemical treatment, corona discharge treatment, mechanical treatment, ultraviolet (UV) treatment, active plasma treatment or glow discharge treatment is performed on the adherend, functional groups such as —OH are formed on the adherend, and when the pressure-sensitive adhesive layer is subjected to a surface treatment using any one of the above treatment methods, silanol groups are formed on the pressure-sensitive adhesive layer, so that when the two layers have been laminated, the base film and the pressure-sensitive adhesive layer can form covalent bonds via the silanol groups.

By performing the surface treatment process as above, it is possible to secure not only bending reliability but also superiority of interface adhesive strength and/or cohesive force at the same time.

Furthermore, the base film may comprise known additives, such as an antistatic agent, an ultraviolet absorber, an infrared absorber, a plasticizer, a lubricant, a colorant, an antioxidant or a flame retardant, and the like.

The pressure-sensitive adhesive layer may be a layer formed by curing the pressure-sensitive adhesive composition for a foldable display comprising the first pressure-sensitive adhesive and the second pressure-sensitive adhesive.

The pressure-sensitive adhesive layer may be, for example, one whose surface has been modified. The surface modification can be carried out to maintain a firm adhesive strength with the adherend, for example, the base film. The surface modification method may be appropriately adopted from the above-described methods for modifying the surface of the base film.

Through the surface modification, silanol groups can be formed in the pressure-sensitive adhesive layer, and the silanol groups can form covalent bonds with functional groups such as —OH on the base film.

As the method of forming the pressure-sensitive adhesive layer, for example, a method of coating a composition comprising a first pressure-sensitive adhesive and a second pressure-sensitive adhesive, and other solvents, and the like on any support and then curing it can be used.

The method of coating and curing is not particularly limited, and for example, may comprise coating using a known method such as bar coating, gravure coating, reverse roll coating, reverse gravure coating, slot die coating, comma coating, spray coating, knife coating, die coating, dip coating, micro gravure coating or wire bar coating, followed by curing with application of appropriate heat.

Advantageous Effects

The present application can provide a pressure-sensitive adhesive composition having appropriate bending reliability so as to be capable of applying to a foldable display and a use thereof.

The present application can also provide a pressure-sensitive adhesive composition having excellent adhesive strength and/or cohesive force and a use thereof.

MODE FOR INVENTION

Hereinafter, the pressure-sensitive adhesive composition for a foldable display according to the present application and the display comprising the same will be described in detail with reference to Examples and Comparative Examples, but the following examples are only examples according to the present application, and thus do not limit the technical idea of the present application.

The physical properties of the pressure-sensitive adhesive composition of the present application were evaluated by the following methods.

1. Measurement of Storage Elastic Modulus

A pressure-sensitive adhesive composition prepared in Examples and Comparative Examples was coated between release films and cured, and then tailored to a size of 15 cm×25 cm, and laminated several times to have a thickness of about 1 mm, after removing the release film on one side. Subsequently, the laminate was tailored into a circle having a diameter of 8 mm and compressed using glass, and then a sample was prepared by allowing the laminate to stand overnight to improve wetting at the interfaces between the layers and removing bubbles generated upon lamination. Subsequently, the sample was placed on a parallel plate, the gap was adjusted, the zero point of Normal & Torque was set, and the storage elastic modulus was measured after confirming stabilization of Normal force.

(1) Measuring Instruments and Measuring Conditions

Measuring instrument: ARES-RDA equipped with a forced convection oven, TA Instruments Inc. (G2 series Rheometer)

(2) Measurement Conditions

Geometry: 8 mm parallel plate
Interval: about 1 mm
Test type: dynamic strain frequency sweep
Strain=0.1 [%]
Initial temperature: −40° C., final temperature: 90° C.
Frequency: 6.2 rad/s 2. Peel Force Measurement The pressure-sensitive adhesive layer prepared according to Examples and Comparative Examples was attached to a glass substrate or a surface-treated PI base film as an adherend and then subjected to aging under a condition of 50° C. and 5 atm for 1 hour or at room temperature for 3 days. After aging, the peel force was measured at a peel rate of 0.3 m/min and a peel angle of 180 degrees at room temperature using a tensile tester (Texture Analyzer).

Example 1

Preparation of Pressure-Sensitive Adhesive Composition (A1)

A first pressure-sensitive adhesive comprising a first polydimethylsiloxane gum with a vinyl group content of 0.7 mol % and a number average molecular weight of about 500,000, and about 0.01 wt % of a MQ resin with a structure of Formula 2 (R is an alkyl group having 1 to 2 carbon atoms), and having a peel force on a glass substrate of about 7 gf/in, and a high tackiness silicone pressure-sensitive adhesive (second pressure-sensitive adhesive, Shinetsu KR 3700) having a peel force on a glass substrate of about 2,170 gf/in were mixed with a solvent, but a pressure-sensitive adhesive composition (A1) was prepared by adjusting the content of the first pressure-sensitive adhesive to about 30 wt % relative to the total solid content of the composition.

Formation of Pressure-Sensitive Adhesive Layer (B1)

The pressure-sensitive adhesive composition (A1) was coated on the primer-treated PET base material and cured to form a pressure-sensitive adhesive layer (B1), where the pressure-sensitive adhesive layer (B1) was subjected to surface modification.

Example 2

A first pressure-sensitive adhesive comprising a first polydimethylsiloxane gum with a vinyl group content of 0.5 mol % and a number average molecular weight of about 600,000, and about 0.001 wt % of a MQ resin with a structure of Formula 2 (R is an alkyl group having 1 to 2 carbon atoms), and having a peel force on a glass substrate of about 2 gf/in, and a second pressure-sensitive adhesive comprising a second-A polydimethylsiloxane silicone gum containing hydroxy groups at both ends and having a number average molecular weight of 700,000, and about 38 wt % of the MQ resin, and having a peel force on a glass substrate of about 337 gf/in were mixed with a solvent, but a pressure-sensitive adhesive composition (A1) was prepared by adjusting the content of the first pressure-sensitive adhesive to about 10 wt % relative to the total solid content of the composition, and a pressure-sensitive adhesive layer (B2) was formed in the same manner as in Example 1 using this composition and subjected to surface modification.

Example 3

A pressure-sensitive adhesive composition (A3) was prepared in the same manner as in Example 1 except that the content of the first pressure-sensitive adhesive was adjusted to about 30 wt % relative to the total solid content of the composition, and a pressure-sensitive adhesive layer (B3) was formed using this composition and subjected to surface modification.

Comparative Example 1

A pressure-sensitive adhesive composition (A4) composed of only the first pressure-sensitive adhesive according to Example 1 and a solvent was prepared, and a pressure-sensitive adhesive layer (B4) was formed in the same manner as in Example 1 using this composition and subjected to surface modification.

Comparative Example 2

A pressure-sensitive adhesive composition (A5) composed of only the second pressure-sensitive adhesive according to Example 2 and a solvent was prepared, and a pressure-sensitive adhesive layer (B5) was formed in the same manner as in Example 1 using this composition and subjected surface modification.

Comparative Example 3

A pressure-sensitive adhesive composition (A6) was prepared by mixing a high tackiness silicone pressure-sensitive adhesive (second pressure-sensitive adhesive, Shin-Etsu KR 3700) having a peel force on a glass substrate of about 2,170 gf/in with a solvent, and a pressure-sensitive adhesive layer (B6) was formed in the same manner as in Example 1 using this composition and subjected surface modification.

Experimental Example 1—Measurement of Peel Force on Glass Substrate or PI Base Film The peel forces of the pressure-sensitive adhesive layers according to Examples 1 to 3 and Comparative Examples 1 to 3 on a glass substrate or a PI base film were measured following "peel force measurement" as explained above, and the results were shown in Table 1 below.

TABLE 1

| | Example | | | Comparative Example | | |
|---|---|---|---|---|---|---|
| | 1 | 2 | 3 | 1 | 2 | 3 |
| Peel force on glass substrate (gf/in) | 1,011 | 32 | 28 | 7 | 2 | 2,170 |
| Peel force on PI base film (gf/in) | 2,000 | 2,200 | 2,700 | — | — | — |

As described in Table 1 above, it could be confirmed that when the pressure-sensitive adhesive layers were formed using the pressure-sensitive adhesive compositions according to Examples 1 to 3 of the present application, they had excellent adhesive strength on the glass substrate or the PI base film, but in the case of the low pressure-sensitive adhesive layers according to Comparative Examples 1 and 2, although the change of the storage elastic modulus was small as shown in Table 2 below, they were not suitable as a pressure-sensitive adhesive composition for a foldable display due to low adhesive strength.

Experimental Example 2—Measurement of Storage Elastic Modulus

In order to examine the storage elastic modulus change rate depending on temperatures after curing of the compositions according to Examples 1 to 3 and Comparative Example 1 to 3, the storage elastic modulus at −40° C. and 90° C. was measured according to the above-described measuring method using an ARES-RDA, an equipment of TA instruments, equipped with a forced convection oven and the results were shown in Table 2.

TABLE 2

| | Example | | | Comparative Example | | |
|---|---|---|---|---|---|---|
| | 1 | 2 | 3 | 1 | 2 | 3 |
| Storage elastic modulus at −40° C. (Pa) | $5 \times 10^6$ Pa | $1.8 \times 10^5$ Pa | $1.8 \times 10^5$ Pa | $8 \times 10^5$ Pa | $8 \times 10^5$ Pa | $6 \times 10^7$ Pa |
| Storage elastic modulus at 90° C. (Pa) | $5 \times 10^4$ Pa | $1.1 \times 10^5$ Pa | $1.7 \times 10^5$ Pa | $7 \times 10^5$ Pa | $7 \times 10^5$ Pa | $5 \times 10^4$ Pa |

Experimental Example 3—Dynamic Folding Test

A PI film laminate was formed by using a PI film (SKC KOLONE PI Co., IF 70) having a thickness of 50 μm as a structure of PI film/pressure-sensitive adhesive layer/PI film/pressure-sensitive adhesive layer/PI film, the surface of the PI film in the laminate was subjected to surface treatment, and the pressure-sensitive adhesive layers prepared in Examples and Comparative Examples were each laminated with the laminate, and then tailored into a size of 140 mm×80 mm. Then, the dynamic folding test was performed for a total of 100,000 times at a temperature of −40° C., room temperature and 90° C. by repeating the folding using a bending test equipment at a curvature radius of 2.5 mm and a speed of 2500 times per hour (once is bending in half and unfolding), and then the results were evaluated as NG if loosing or bubbling occurred at the interface between the PI film laminate and each of the pressure-sensitive adhesives according to Examples 1 to 3 and Comparative Example 3, and OK if no loosing or bubbling occurred, and shown in Table 3 below. However, in the case of Comparative Examples 1 and 2, the laminate could not be formed due to low adhesive strength.

TABLE 3

| | | Example | | | Comparative |
|---|---|---|---|---|---|
| | Condition | 1 | 2 | 3 | Example 3 |
| Dynamic folding test | −40° C. | OK | OK | OK | NG |
| | room temperature | OK | OK | OK | OK |
| | 90° C. | OK | OK | OK | OK |

As described in Experimental Examples 1 to 3 and Tables 1 to 3, in the case of the pressure-sensitive adhesive layers according to Examples 1 and 2, since they have appropriate adhesive strength and cohesive force and exhibit the storage elastic modulus at a temperature of −40° C. of $5.0 \times 10^6$ Pa or less, not only the folding reliability required in the foldable display can be ensured, but also the releasing peel force can be maintained in a very low range to exhibit excellent release force.

The invention claimed is:

1. A pressure-sensitive adhesive composition for a foldable display comprising:
   a first pressure-sensitive adhesive comprising a first silicone gum and having a peel force on a glass substrate, as measured at a peel rate of 0.3 m/min and a peel angle of 180 degrees, of 10 gf/in or less; and
   a second pressure-sensitive adhesive having a peel force on a glass substrate, as measured at a peel rate of 0.3 m/min and a peel angle of 180 degrees, of 200 gf/in or more,
   wherein said first pressure-sensitive adhesive is contained in an amount of 5 wt % to 50 wt % relative to the total solid content of the composition, and
   a storage elastic modulus (G') measured after curing within a temperature range of −40° C. to 90° C. is $1.0 \times 10^7$ Pa or less.

2. The pressure-sensitive adhesive composition for a foldable display according to claim 1,
   wherein the first pressure-sensitive adhesive comprises a first MQ resin in a content of less than 5 wt %, where MQ resin is a silicone compound having at least a three-dimensional reticular steric molecular structure comprising a monofunctional siloxane unit (M Unit) and a tetrafunctional siloxane unit (Q unit).

3. The pressure-sensitive adhesive composition for a foldable display according to claim 1,
   wherein the first silicone gum has a number average molecular weight in a range of 400,000 to 800,000.

4. The pressure-sensitive adhesive composition for a foldable display according to claim 1,
   wherein the first silicone gum has a vinyl group content in a range of 0.5 to 1.5 mol %.

5. The pressure-sensitive adhesive composition for a foldable display according to claim 1,
   wherein the first pressure-sensitive adhesive comprises a first MQ resin,
   wherein the second pressure-sensitive adhesive is a second-A pressure-sensitive adhesive which comprises a second-A silicone gum and a second-A MQ resin and has a peel force on a glass substrate, as measured at a peel rate of 0.3 m/min and a peel angle of 180 degrees, in a range of 200 gf/in to 400 gf/in, wherein the MQ resin is a silicone compound having at least three dimensional reticular steric molecular structure comprising a monofunctional siloxane unit (M Unit) and a tetrafunctional siloxane unit (Q Unit) and the second-A MQ resin is different from the first MQ resin.

6. The pressure-sensitive adhesive composition for a foldable display according to claim 5, wherein the second-A pressure-sensitive adhesive has a storage elastic modulus measured at −40° C. of $10^7$ Pa or less.

7. The pressure-sensitive adhesive composition for a foldable display according to claim 5, wherein the second-A pressure-sensitive adhesive comprises the second A MQ resin in a content of 40 wt % or less based on the total weight of the second-A pressure-sensitive adhesive.

8. The pressure-sensitive adhesive composition for a foldable display according to claim 5, wherein the second-A silicone gum has a number average molecular weight in a range of 500,000 to 1,000,000.

9. The pressure-sensitive adhesive composition for a foldable display according to claim 5, wherein the second-A silicone gum is a linear polydimethylsiloxane containing hydroxyl groups at both ends.

10. The pressure-sensitive adhesive composition for a foldable display according to claim 1, wherein the first pressure-sensitive adhesive comprises a first MQ resin, wherein the second pressure-sensitive adhesive is a second-B pressure-sensitive adhesive which comprises a second-B silicone gum and a second-B MQ resin and has a peel force on a glass substrate, as measured at a peel rate of 0.3 m/min and a peel angle of 180 degrees, in a range of 1,000 gf/in to 10,000 gf/in, wherein the MQ resin is a silicone compound having at least three dimensional reticular steric molecular structure comprising a monofunctional siloxane unit (M Unit) and a tetrafunctional siloxane unit (Q Unit) and the second-B MQ resin is different from the first MQ resin.

11. The pressure-sensitive adhesive composition for a foldable display according to claim 10, wherein the second-B pressure-sensitive adhesive has a storage elastic modulus measured at −40° C. of more than $10^7$ Pa.

12. The pressure-sensitive adhesive composition for a foldable display according to claim 10, wherein the second-B pressure-sensitive adhesive comprises the second-B MQ resin in a content of 45 wt % or more based on the total weight of the second-B pressure-sensitive adhesive.

13. The pressure-sensitive adhesive composition for a foldable display according to claim 10, wherein the second-B silicone gum is a silicone rubber containing a vinyl group at an end.

14. A foldable display comprising a pressure-sensitive adhesive layer, which is a cured product of the pressure-sensitive adhesive composition for a foldable display of claim 1, attached to an adherend.

15. The foldable display according to claim 14, wherein upon repeating folding of the folding display at a speed of 2500 times per hour to have a curvature radius of 2.5 mm (once is bending in half and unfolding) at room temperature, the number of times that no loosing or bubbling occurs is 100,000 times or more.

16. The foldable display according to claim 14, wherein the adherend is a base film, and said base film and said pressure-sensitive adhesive layer form covalent bonds via silanol groups contained in said pressure-sensitive adhesive layer.

* * * * *